United States Patent
Whyatt et al.

(10) Patent No.: US 7,862,633 B2
(45) Date of Patent: Jan. 4, 2011

(54) METHOD AND SYSTEM FOR INTRODUCING FUEL OIL INTO A STEAM REFORMER WITH REDUCED CARBON DEPOSITION

(75) Inventors: Greg A. Whyatt, West Richland, WA (US); Christopher M. Fischer, Yakima, WA (US); James D. Davis, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 835 days.

(21) Appl. No.: 11/734,909

(22) Filed: Apr. 13, 2007

(65) Prior Publication Data

US 2008/0253944 A1    Oct. 16, 2008

(51) Int. Cl.
    *B01J 8/00*    (2006.01)
(52) U.S. Cl. .................. 48/127.9; 48/197 R; 48/127.1; 48/198.1; 48/211; 48/198.7; 48/198.3; 48/212; 48/214; 48/75; 48/94; 48/61; 422/188; 422/189; 422/190; 422/211
(58) Field of Classification Search ......... 422/188–190; 48/75, 127.9, 198.7, 198.3, 211
See application file for complete search history.

(56) References Cited

U.S. PATENT DOCUMENTS

| | | |
|---|---|---|
| 2,976,134 A | 3/1961 | Paull |
| 4,400,182 A | 8/1983 | Davies et al. |
| 4,516,632 A | 5/1985 | Swift et al. |
| 4,729,428 A | 3/1988 | Yasutake et al. |
| 5,016,707 A | 5/1991 | Nguyen |
| 5,212,004 A | 5/1993 | Bottcher et al. |
| 5,270,127 A | 12/1993 | Koga et al. |
| 5,275,235 A | 1/1994 | Cesaroni |
| 5,409,058 A | 4/1995 | Yuasa et al. |
| 5,455,401 A | 10/1995 | Dumais et al. |
| 5,534,328 A | 7/1996 | Ashmead et al. |
| 5,611,214 A | 3/1997 | Wegeng et al. |

(Continued)

FOREIGN PATENT DOCUMENTS

DE    19956378 A1    6/2001

(Continued)

OTHER PUBLICATIONS

Marschner, F, et al.: "Gas Production" Ullmann's Encyclopedia of Industrial Chemistry, Jun. 15, 2000 pp. 1-21 XP002253967.

(Continued)

*Primary Examiner*—Basia Ridley
*Assistant Examiner*—Kaity V. Handal
(74) *Attorney, Agent, or Firm*—Derek H. Maughan

(57) ABSTRACT

A system and method for creating reformate with decreased carbon deposition. The system is made up of a steam source, a superheater, a fuel injection device, a preformer, and a reformer with catalyst linings. The system functions to superheat steam while maintaining the fuel at a lower temperature prior to injection and mixing with the steam. After injection and mixing, the steam and fuel mixture is then passed through a preformer where catalysts treat a portion of the fuel and steam mixture. After these portions are treated with a catalyst, the mixture is passed through to a reformer where further treatment of the material by catalyst takes place.

14 Claims, 3 Drawing Sheets

U.S. PATENT DOCUMENTS

| | | |
|---|---|---|
| 5,620,616 A | 4/1997 | Anderson et al. |
| 5,657,818 A | 8/1997 | Bottcher et al. |
| 5,658,537 A | 8/1997 | Dugan |
| 5,660,227 A | 8/1997 | Crowe |
| 5,690,763 A | 11/1997 | Ashmead et al. |
| 5,749,413 A | 5/1998 | Crowe |
| 5,811,062 A | 9/1998 | Wegeng et al. |
| 5,836,383 A | 11/1998 | Zwittig |
| 5,843,385 A | 12/1998 | Dugan |
| 5,911,273 A | 6/1999 | Brenner et al. |
| 6,082,449 A | 7/2000 | Yamaguchi et al. |
| 6,129,973 A | 10/2000 | Martin et al. |
| 6,152,215 A | 11/2000 | Niggemann |
| 6,192,596 B1 | 2/2001 | Bennett et al. |
| 6,200,536 B1 | 3/2001 | Tonkovich et al. |
| 6,994,829 B2 | 2/2006 | Whyatt et al. |
| 2004/0163312 A1* | 8/2004 | Bloomfield et al. ....... 48/214 A |
| 2005/0247552 A1 | 11/2005 | TeGrotenhuis et al. |
| 2006/0179718 A1 | 8/2006 | Whyatt et al. |
| 2006/0277828 A1* | 12/2006 | Licht .......................... 48/198.7 |
| 2007/0220873 A1* | 9/2007 | Bosteels ...................... 60/299 |

FOREIGN PATENT DOCUMENTS

| | | |
|---|---|---|
| EP | 1403215 A | 3/2004 |
| WO | WO9966279 A2 | 12/1999 |
| WO | WO03022424 A | 3/2003 |

OTHER PUBLICATIONS

PCT Written Opinion/Search Report.

Altin, et al, Ind. Eng. Chem Res. 2000, 39, pp. 642-645.

Harris, et al., Journal of Microelectromechanical Systems, vol. 9 No. 4, Dec. 2001.

Lin et al., Integration of mircofluidics/electrochemical system for trace metal analysis by stripping voltammetry, Reprinted from Microfluidic Devices and Systems II, Sep. 20-21, 1999, Santa Clara, CA, Proceedings of SPIE Reprint.

Martin et al., Laser micromachined and laminated microchannel components for chemical sensors and heat transfer applications, reprinted from Micromachined Devices and Components III, Sep. 29, 1997, Austin, TX, Proceedings Reprint.

* cited by examiner

METHOD AND SYSTEM FOR INTRODUCING FUEL OIL INTO A STEAM REFORMER WITH REDUCED CARBON DEPOSITION

BACKGROUND OF THE INVENTION

1. Field of the Invention

This invention generally relates to systems steam reforming of hydrocarbon fuels to generate hydrogen rich reformate for use in fuel cells.

2. Background Information

As a part of the overall strategy to try and find cleaner and more efficient methods of providing power, new fuels and systems have and continue to be developed. Among these technologies and devices are so called fuel cells, particularly polymer electrolyte fuel cells (PEFCs). These devices generally require hydrogen fuel to operate and when provided with these materials provide a clean and reliable energy source. However, the difficulty in safely and efficiently storing and distributing hydrogen typically limits the practical use of such devices.

To attempt to remedy this problem a fuel processor using the steam reforming reaction can be used to liberate hydrogen from a hydrocarbon fuel to provide hydrogen at the point of use for a fuel cell. Among the potential hydrocarbon sources that may be reformed to generate hydrogen are lower volatility fuels with high boiling ranges such as home heating oil, diesel fuel, JP-8, and other similar hydrocarbon fuels.

The reformation process typically involves the conversion of a hydrocarbon to a mixture of carbon dioxide, carbon monoxide and hydrogen, along with residual amounts of methane. Before introducing the fuel into the reforming reactor, the fuel must be brought into the vapor phase and mixed with steam. However, the boiling range of these hydrocarbons is close to the temperatures at which breakdown of the hydrocarbons may begin to occur which increases the potential for formation of carbon deposits within the reforming system. The formation of carbon deposits may adversely affect the reformer performance by reducing catalyst activity or by obstructing flow passages.

The tendency for the formation of deposits increases as the temperature increases. Because the typical reformation process requires elevated temperatures to vaporize, preheat and then react these materials, the formation of carbon deposits is a frequent problem. Furthermore, once these processes of contaminant creation and carbon deposition begin, it is very difficult for these processes to be reversed, and the susceptibility of the system to further influence by these materials is increased.

SUMMARY

The present invention is a method and system for reducing carbon deposits in reformate fuel systems thus increasing the efficiency of the reformate system as well as reducing the production of unwanted by products such as methane. The method may include any of a variety of various novel steps including: utilizing superheated steam to provide sufficient energy to vaporize relatively small quantities of cooled fuel into a hot mixture; rapidly achieving intimate mixing of steam and fuel; passing this mixture through a prereformer to partially treat the mixture prior to passing this mixture into a reformer, and passing the material through a reformer that has a catalyst within its header.

The system for performing such steps may be configured in any of a variety of ways but is typically characterized by a system that has at least one of the following items: a steam source, configured to produce a steady source of steam; a superheater for superheating the steam, a mixing tube extending between the steam source and a prereformer, the mixing tube having an inlet configured to receive a preselected quantity of a preselected fuel into a stream of steam passing through said mixing tube; the mixing tube being of sufficient proportions so as to allow thorough mixing of the preselected quantity of the preselected fuel within the stream of steam so as to form an even mixture; a prereformer operatively connected to the mixing tube, so as to receive the mixture within the prereformer and to treat a portion of the mixture with at least one catalyst; and a reformer operatively connected to the prereformer.

In the preferred embodiment of the invention which is set forth hereafter, the preferred combinations of the elements which are set forth above are arranged in the form and to comply with the embodiment which is the best mode known by the inventor to practice the invention as defined by the claims. The purpose of the foregoing abstract is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions I have shown and described only the preferred embodiment of the invention, by way of illustration of the best mode contemplated for carrying out the invention. As will be realized, the described embodiment is capable of modification in various respects without departing from the invention as defined by the claims. Accordingly, the drawings and description of the preferred embodiment set forth hereafter are to be regarded as illustrative in nature, and not as restrictive.

DETAILED DESCRIPTION OF THE INVENTION

Figure 1:
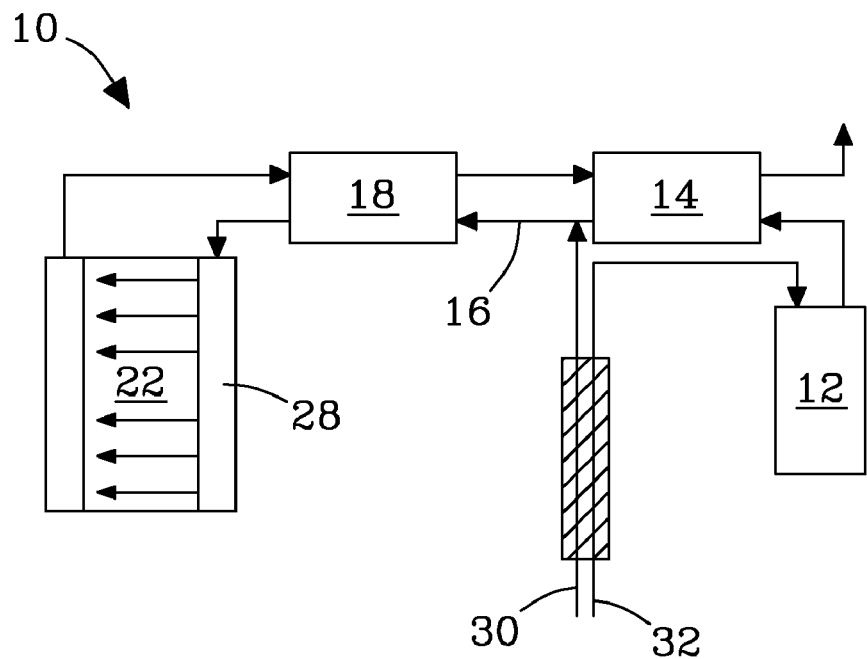
FIG. 1 is a schematic of a first preferred embodiment of the system of the present invention

The following description includes the preferred best mode of one embodiment of the present invention. It will be clear from this present description of the preferred embodiment that the invention is not limited to these illustrated embodiments but that the invention also includes a variety of other embodiments and modifications thereto. Therefore the present description should be seen as merely illustrative and not restrictive in any manner. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

In one preferred embodiment of the invention, the invention is a system and method by which generally commercially available fuels such as a No. 2 fuel oil, JP-8 or diesel may be utilized as a hydrocarbon source for catalysis in fuel cell operations. The method and configuration of this preferred present embodiment of the invention allows the usage of these heavier types of fuels and hydrocarbons in a steam reforming reactor without the build up of carbon deposits within the system or upon the catalysts. In as much as many military vehicles operate on a JP-8 fuel, and many commercial trucks typically use diesel, the reforming of these fuels is highly desirable for fuel cell based power systems that are vehicle mounted or portable in nature.

One of the problems that exists with many of these types of fuels is that the temperature of vaporization must typically occur at high temperatures which typically also cause the increased formation of carbon deposits. Thus, direct vaporization of the fuel can lead to deposits forming in the vaporizer as well as changes in the fuel which can lead to coke deposit formation within the reforming system leading to clogging, catalyst deactivation or other problems. In the preferred embodiment of the present invention, the system and method of heating, mixing, and treatment of the fuels within the system allows heavy fuels to be used without these typically attendant problems.

While the description of the preferred embodiment of the present invention is set forth utilizing these specific types of hydrocarbons it should be distinctly understood that the invention is not limited thereto but may be variously embodied to include use with any of a variety of other types of materials as desired by a user and as would be apparent to a person of skill in this art. In addition to use in a reformate for fuel cells use application as is described in the present preferred embodiment, the present invention may also be utilized in a variety of other fields including the generation of synthesis gasses, and the direct use of various other types of fuels in catalysis. Accordingly, the following description of the invention is intended to be illustrative in nature and not restrictive.

FIGS. 1-5(b) show a variety of views of one preferred embodiment of the present invention. While views of this preferred embodiment are shown it is to be distinctly understood that the invention is not limited thereto but may be variously embodied in harmony with the device that is described in the claims set forth hereafter. FIG. 1 is a view of a. schematic of the various parts of the system of the preferred embodiment of the present invention. The following description of this schematic describes in general terms the configuration of pieces and the method that this present preferred embodiment of the invention utilizes, For purposes of simplicity, matters related to cleaning and pre-treatment of the fuels described herein (such as the lowering of the sulfur content of these fuels) are not discussed and the fuels described in these illustrative examples already have a pre-designated low sulfur content. However it is to be distinctly understood that the inventive method and system could also be modified to include a variety of other types of configurations and steps that remove undesired materials such as sulfur and other materials from the fuel prior to their use in the described system. Such modifications are anticipated and included within the scope of the present invention.

Referring now to FIG. 1, FIG. 1 shows a simple schematic of the preferred present embodiment of the invention wherein a steam source 12, such as a vaporizer produces a stream of steam that is conducted to a superheater 14 where this steam is then superheated. The superheated steam is then exited from the superheater 14 into a mixing tube 16 wherein a preselected quantity of a preselected liquid fuel is added to and turbulently mixed with, this steam to form a well-mixed mixture of fuel and steam in desired proportions and where all of the fuel components are in a vapor phase. As will be discussed later in greater detail, in the preferred embodiment of this invention this mixing is accomplished by atomizing preselected quantities of fuel into a steady stream of steam and turbulently mixing the steam and fuel until an even mixture having predesignated and preselected composition is achieved. In order to prevent unwanted heating of the fuel prior to the injection of this fuel into the stream of steam, the fuel delivery line 30 is cooled by being in thermal contact with ambient temperature water being fed to the steam source. In the present embodiment of the invention this is done by placing the water delivery line 32 in contact with the fuel delivery line 30.

After the appropriate mixture of fuel and steam has been achieved, this mixture is then fed to a prereformer 18 wherein this mixture is passed through panels and over catalysts so that initial treatment of the mixture may take place. After passing this mixture through this prereformer 18, this partially treated material is then passed to a reformer 22 wherein the hot reformate is produced.

The entire quantity of hot reformate produced in the reforming reactor, including hydrogen and other gases, then passes through the prereformer 18 to provide heat to the pre-reforming reaction occurring as incoming steam and fuel pass over catalysts within the prereformer 18, and then through the steam superheater 14, where heat is transferred from the reformate to superheat the incoming steam. After passing through these areas the reformate is then exited to other portions of the device.

Utilizing the heat content of the reformate product to heat the pre-reformer 18 and steam superheater 14 improves efficiency and supports full vaporization and mixing of the steam with the fuel and controlled temperature pre-reforming of the fuel which reduces the formation of non desired byproducts such as carbon deposits. A more detailed description of this process and system in which this process is performed follows.

In this preferred embodiment of the invention, the steam source 12 is a microchannel vaporizer, such as the one shown in U.S. Pat. No. 6,994,829. This device is selected because it is capable of generating a very steady, non-pulsing flow of fully vaporized steam which rapidly tracks changes in the inlet feed rate, assuring accurate and steady steam to carbon ratios. Steam from the steam source 12 is then passed to a super heater 14 through a tube. Preferably this steam superheater 14 is a micro-channel heat exchanger which can be designed to have relatively constant effectiveness over the range of operating rates and is highly compact which reduces heat losses from the system. The steam superheater 14 superheats the steam from a temperature of about 220 C to 270 C to a temperature of about 460 C to 510 C. Once this has taken place the steam passes out of the superheater 14 and into a fuel mixing tube 16.

The inclusion of a steam superheater 14 in the present invention provides a variety of advantages to the present invention. When the steam is initially produced a relatively small amount of superheat is present within the steam. Passing this steam through the superheater 14, further heats the steam so as to raise the temperature of the steam such that when this steam is mixed with a predesignated quantity of fuel, (preferably ambient temperature liquid fuel) the resulting mix will, at a minimum, be fully in the vapor phase at the preselected operating pressure. The superheated portions of the steam will give up heat which will be utilized to vaporize the fuel which has been injected into the stream of steam that emanates from the steam superheater.

If the steam is not sufficiently hot, components of the fuel with higher boiling points will not be raised to their vapor phase point and will continue to exist as liquids within the steam stream. As a result, the mixture of fuel and steam will not be uniform and the time during which the condensed components remain in the high temperature zone will be increased. This can lead to an increased potential for carbon deposition formation. By delivering additional heat necessary to bring the feed mixture to reforming temperature to the steam alone, the time at which the non-mixed fuel is at an elevated temperature and the maximum temperature experienced by the fuel before mixing with steam are minimized, reducing the potential for carbon formation.

It is desired to avoid heating the fuel to its vaporization temperature in the absence of steam. Also, once heated to vaporization temperature, the time before the fuel is mixed with steam and reforming initiated should be minimized. To accomplish this, the system of the present invention includes several features. First, the fuel supply line 30 is insulated. Second, the water line 32 which provides water to the steam source is connected so as to be in intimate thermal contact with the fuel supply line. This causes the fuel to be cooled by the passage of this water. Third, in some instances the delivery of fuel into the stream of steam may be is monitored by a delivery device so as to enhance proper vaporization and mixing of the material within the device.

Figure 2:
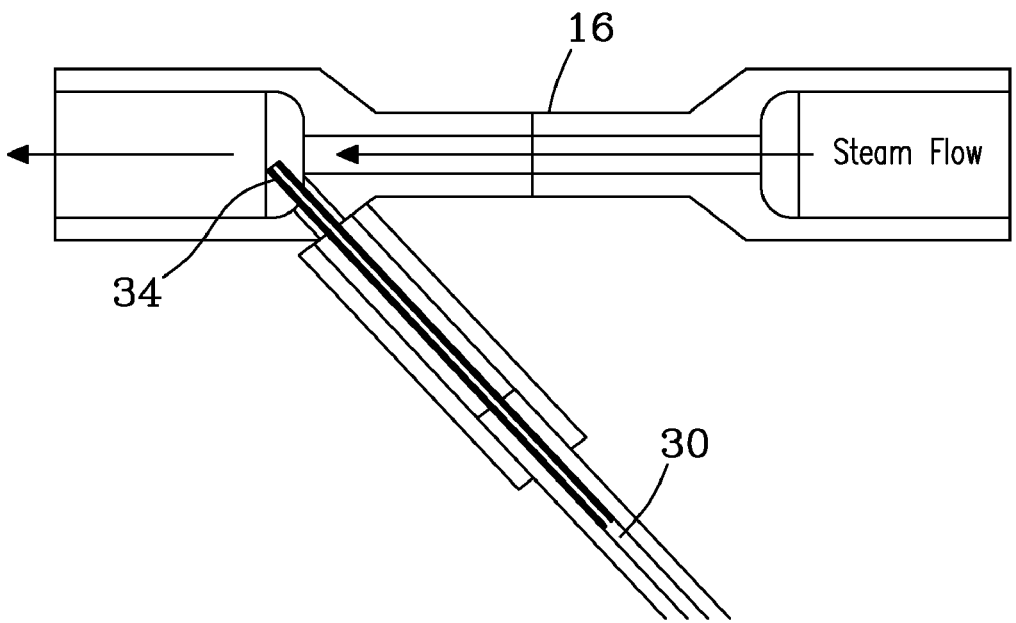
FIG. 2 is a detailed cut away view of a portion of the mixing tube portion of the embodiment shown in FIG. 1.
Figure 3:
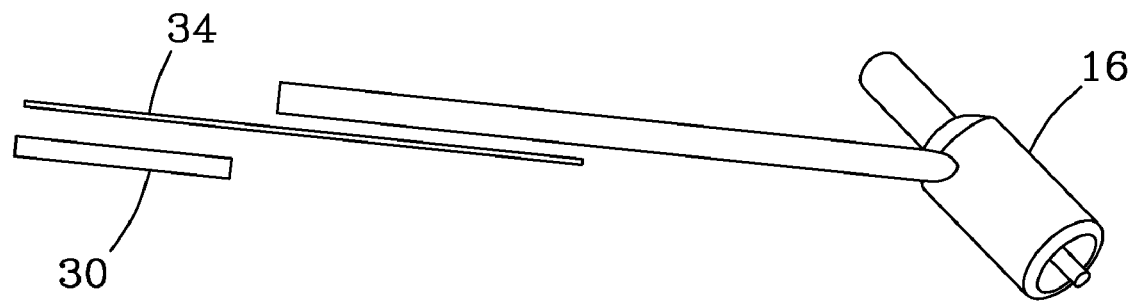
FIG. 3 is an assembly view of the fuel delivery and mixing tube portions of the preferred embodiment of the present invention.
Figure 4:
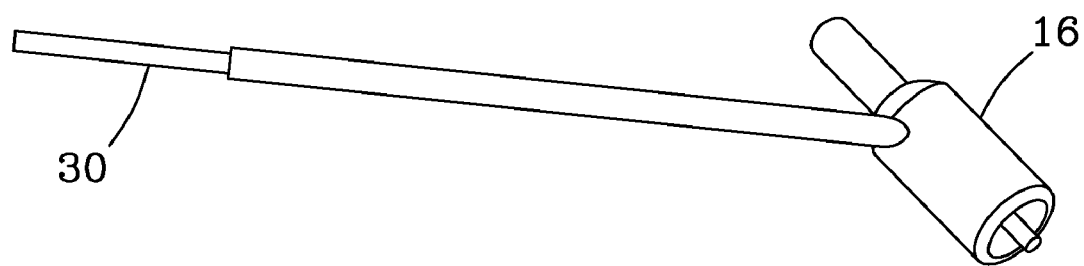
FIG. 4 is an assembled view of the portions of the preferred embodiment of the invention which are shown in FIG. 3.

A detailed view of the embodiment of the fuel mixing tube that is present in this preferred embodiment of the invention is shown in FIGS. 2, 3 and 4. The appropriate mixing of the fuel with the stream of steam in the present invention is accomplished by the configuration which is shown in these figures. Referring first to FIG. 2, the fuel line extends from a fuel source along an insulated and cooled conduit to a terminus that is adapted to hold a hollow hypodermic type needle 34 with an opening of a predefined size at each end. Fuel is delivered into the stream of steam by the steam being rapidly jetted across the tip of the hypodermic needle 34 through which the fuel is delivered. The increased rate of flow across the end of this needle 34 is accomplished by narrowing the diameter of the tubing through which the steam flows between tubing sections that have larger diameters. FIGS. 3 and 4 show assembled and unassembled views of the fuel-steam mixer portions of the invention prior to assembly. In this preferred embodiment of the invention, the hypodermic needle 34 is brazed into the fuel supply line and then the fuel supply line with the needle is brazed into the hypodermic entry port so that the needle tip is positioned just downstream of the expansion in the steam line.

The combination of superheated steam moving across the end of the needle 34 through which a controlled rate of fuel flows allows the fuel to be atomized and then evaporated using the sensible heat of the superheated steam. By vaporizing the fuel upon exit from the hypodermic needle, into a larger molar flow of steam (typically the minimum ratio of steam to carbon atoms is 3) the temperature necessary to achieve full vaporization of the fuel is reduced. Thus, for an average fuel represented as $C_{12}H_{26}$ the feed would consist of (on a molar basis) $36/37=97.3\%$ steam and $1/37=2.7\%$ fuel. This high velocity superheated steam flows over the tip of the delivery needle, atomizes the liquid hydrocarbon and almost immediately evaporates and mixes the liquid fuel into the steam. The high mole fraction steam also assures the residence time of the fuel at an elevated temperature before beginning reforming is short relative to a system which vaporizes fuel separately.

After being injected into the stream of steam the fuel is mixed by turbulent flow within a mixing tube 16. It has been found that a tube having a length of approximately 20 times the inner diameter of the conduit in which it is placed enables the appropriate level of mixing, when JP-8 or diesel fuel is utilized. It should be apparent and understood that the length of the tube and the configurations of this device may be appropriately modified according to the needs and necessities of the user. This factor is insensitive to tube diameter as long as flow is turbulent. Hence, the length of the mixing tube required is shorter if a smaller diameter tube is used. The tubing diameter is selected so that turbulent flow is achieved throughout the anticipated steam flow rates for the system and so that pressure drop at maximum flow does not significantly change the overall feed pressures required for the system.

During this mixing process it is important to avoid boiling within the needle 34 as this may lead to slugging of the fuel and the formation of a non-uniform mixture downstream from the needle 34. In low pressure operations, it is important that the fuel be maintained below the bubble point temperature within the fuel line. If the bubble point temperature is exceeded, slugging of the fuel through the needle may occur, resulting in slugs of steam fuel mixture being formed that are alternately fuel rich and fuel lean. To help prevent this, the size of the delivery tube 30 is selected so as to minimize the residence time wherein the fuel is between the insulation near the front of the case and the point where the fuel enters the injection needle. In addition, the small diameter fuel line 30 is brazed to the water feed line 32 until just before it splits off to be injected into the steam line. This allows the feed water to act as a coolant and prevents premature heating of the fuel.

In operation, the permeation of hydrogen through a membrane (typically made of palladium alloy) is enabled by increased pressure located within the reformer 22. Once the system pressure has increased, the pressure will typically be greater than the critical pressure of the fuel. As a result, the potential for slugging of the fuel due to vaporization within the fuel line 30 or needle 34 is eliminated.

Figure 5A:
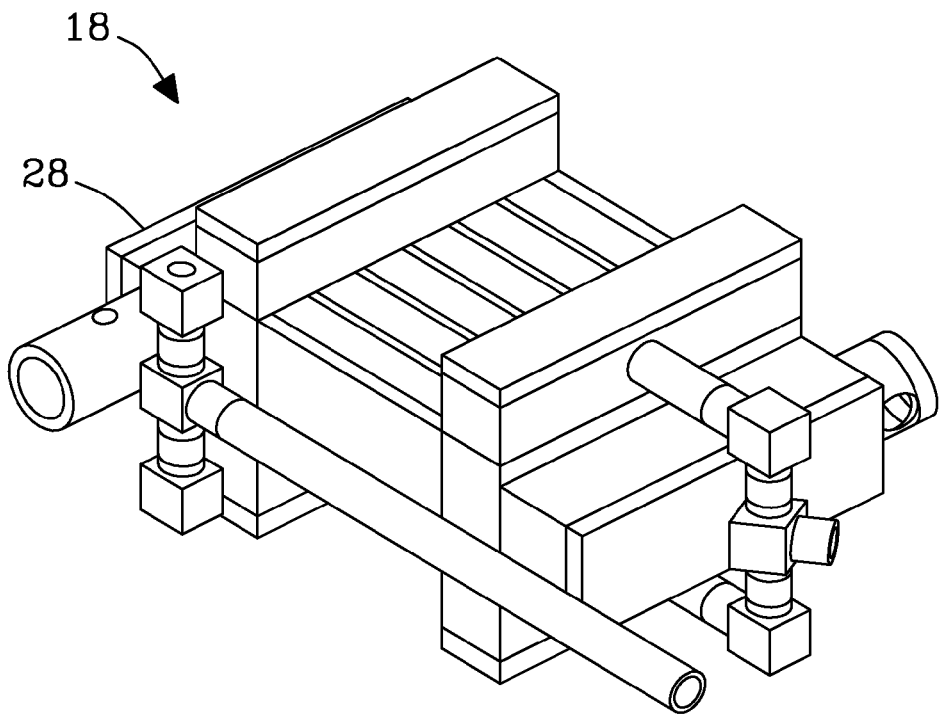
FIG. 5a is a perspective view of the prereformer of the present invention.
Figure 5B:
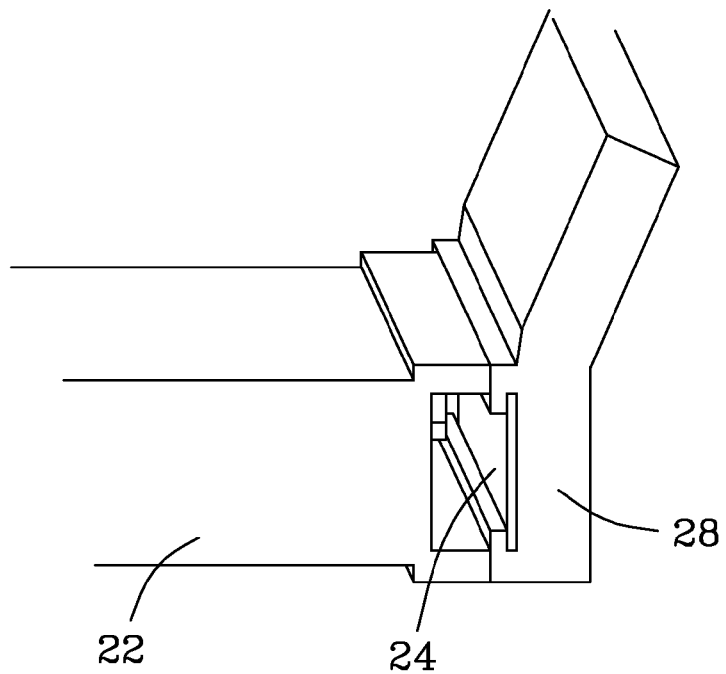
FIG. 5b is a detailed cut away view of the header portion of the prereformer/reformer portions of the preferred embodiment of the invention with the catalyst strip in place.

After passing though this length of mixing tubing 16 shown in FIG. 2, the mixture is appropriately mixed and is run through a prereformer device 18, as is shown in FIG. 5a, and then on to a reformer 22 made up of various steam reforming panels. Detailed views of these features and devices are shown in FIG. 5(b).

Referring now to FIG. 5 a perspective view of the prereformer 18 of the preferred embodiment of the present invention is shown. FIG. 6 shows internal features of this same prereforming device 18. In the present embodiment of the invention, the prereformer device 18 is operatively connected to a tube which receives the hot mixed steam and fuel mixture. The prereformer 18 is configured so that upon entering the prereformer 18 the hot mixture enters from the top of the device and moves across a header 28 that is configured so as to have a constant cross sectioned area. The physical structure of this cross sectional area is designed so as to control the velocity of the incoming reactants at the top of the header 28 and ensure that good flow distribution is obtained. As this material flows down the header 28 the molar flow becomes smaller and smaller until at the bottom of the header the flow is equal to the quantity flowing through the bottom channel of the panel. This results in a longer residence time in the header 28, and in those portions where the catalyst 24 is absent, a delay in the onset of reforming for reactants flowing through the bottom of the header 28.

In addition, the reforming panel 22 is heated by combustion gases and thus is hotter than the temperature of the partially reformed hot mixture leaving the prereformer 18 which contains the incoming reactants for the reformer panel. As a result, the incoming reactants heat as the mixture progresses down the header with the highest maximum temperatures occurring at the bottom of the header. It is the bottom of this header on the first reformer panel that is one of the most critical locations for carbon deposition. However, as is shown in the preferred embodiment of the present invention, a catalyst strip 24 is placed within the header 28, thus the reforming begins within the header 28. The extent of reforming occurring in the header 28 is typically negligible at the top of the header 28 but becomes greater toward the bottom of the header 28.

The inclusion of this reforming reaction helps to cool the inlet header and introduces more hydrogen into the flow of material within the header which in turn which increases the gas volume, and reduces the residence time of the fuel within the delivery device and increases the hydrogen partial pressure. This in turn also helps to suppress carbon formation. Detailed views of these features are shown in FIG. 5(b).

In the present preferred embodiment of the invention, the reformer system is a 7.5 kWe scale reformer system in which fuel is delivered by a $1/16^{th}$ inch tube into a 0.028 inch OD (~0.013-inch ID) hypodermic needle. Preferably, the needle is positioned with the tip of the needle located within the center of a steam flow chamber that is undergoing an expansion from $1/8^{th}$-inch tube to $1/4$-in tube. While these features and descriptions of the preferred design of the invention are described above it is to be distinctly understood that the invention is not limited thereto but may be various otherwise embodied according to the needs and necessities of the user.

For increased efficiency of the system the selection of a reforming catalyst that does not itself promote carbon formation is preferred. The selection of a particular catalyst should be made with this issue clearly in the mind of the user. Such a selection is an appropriate determination that can be made by a party of skill in the art; however the inclusion or exclusion of any particular catalyst is not a limiting factor upon the scope of the present invention.

The reduction of carbon deposition can be further enhanced by utilizing materials that are not conducive to the formation of carbon deposits. In the present preferred embodiment of the invention, all of the surfaces to which unreformed fuel may be exposed are fabricated from Inconel 625, with the exception of the injection needle which is made from stainless steel. In addition to excellent high temperature properties, Inconel 625 contains minor component additives of Niobium plus Tantalum (3.15-4.15%) and Molybdenum (8-10%). These materials are believed to also further the resistance of the present invention to forming carbon deposits. While the present preferred embodiment of the invention is described as being utilized and made from these materials it is to be distinctly understood that the invention is not limited thereto but that a variety of other types of materials may also be utilized according to the needs and necessities of the user.

In some prior art fuel reforming systems, recuperators that preheat incoming reactants using reformate product from a reformer have been utilized to attempt to increase efficiency. However one problem that exists in such a circumstance is that while such a reheating device maintains an appropriate temperature for reactions, (about 650 to $800^t$ C) heating to too high a temperature without initiating reforming can lead to formation of carbon deposits. This phenomenon has been observed particularly as reformate temperatures approach 800 C. These carbon deposits build up on a variety of areas in particular near the inlet of a fuel cell reformer, and the outlet of a recuperator if the particular embodiment utilizes such a device.

In the present embodiment, this problem has been significantly reduced by placing reforming catalyst into the recuperator to form a prereformer 18. These catalysts initiate a reforming reaction at a lower temperature than the main reformer, using heat extracted from the hot reformate. The presence of these catalysts provides several functions including: providing cooling to the recuperator which reduces the maximum temperature that the steam and fuel will reach before entering the reformer panels to a range of approximately 570° C. to 600° C.; and reforming 5 to 10% of the hydrocarbon feed to produce ~3.4 to 8% hydrogen in the feed stream. This range is believed to reduce carbon deposit formation, and is substantially different from other methods and systems. This process also increases the velocity of the gas within the system, as compared to many other systems due to an increase in molar flow which shortens the residence time of the fuel in the header of the inlet reformer panel.

One additional feature of the preferred embodiment of the present invention is that the methane (in this instance a non-desired by product) concentration was very low (<0.28%) while the typical equilibrium methane content for reforming at these temperatures is quite high. The reason for this is believed to be that early in the reaction process the level of fuel conversion is low so that the steam concentration is high relative to CO and $H_2$, which pushes the equilibrium for the reaction $CO+3H_2 \rightarrow CH_4+H_2O$ away from the formation of methane. This is another feature that demonstrates the increased efficiencies of the present preferred embodiment over other systems and devices that exist in the prior art.

While various preferred embodiments of the invention have been shown and described, it is to be distinctly understood that this invention is not limited thereto but may be variously embodied to practice within the scope of the following claims. From the foregoing description, it will be apparent that various changes to the application may be made without departing from the spirit and scope of the invention as defined by these claims.

What is claimed is:

1. A system for reducing carbon deposition in a steam reforming assembly for hydrocarbon fuels, said system comprising:
    a steam source, said steam source configured to produce a steady flow of steam;
    a mixing tube extending between said steam source and a prerefomer, said mixing tube having an opening configured to receive fuel into a flow of steam passing through said mixing tube and to deliver a thoroughly mixed uniform mixture to a recuperative prereformer;
    said recuperative prereformer operatively connected to said mixing tube and configured to receive said mixture within said prereformer and to treat a portion of said mixture with at least one catalyst; and
    a reformer operatively connected to said prereformer downstream, said reformer having an inlet operatively connected to a header said header containing at least one catalyst.

2. The system of claim 1 further comprising a superheater operatively connected between said steam source and said mixing tube whereby steam from said steam source is transferred to said superheater, and said superheater, super heats the steam from said steam source.

3. The system of claim 1 wherein fuel is delivered to said mixing tube through a cooled delivery line.

4. The systems of claim 3 wherein said cooled delivery line is cooled by a water line proximate to said delivery line.

5. The system of claim 1 wherein said fuel is introduced into said flow of steam by atomizing said preselected quantity of fuel through a hollow needle.

6. The system of claim 1 wherein said fuel is mixed into said steam in a molar concentration ratio of about three or more moles of steam per mole of carbon contained in the fuel.

7. A method for reducing carbon deposition in reformate fuel cell applications, said method comprising the steps of:
   providing a stream of steam having a preselected quantity of superheat within said stream of steam;
   adding a preselected quantity of fuel into said stream of steam;
   mixing said fuel and stream of steam so as to obtain uniform mixing of said fuel within said stream of steam;
   delivering a mixture of fuel and steam to a prereformer, said prereformer containing at least one catalyst therein; and
   passing said mixture from said prereformer to a reformer device having an inlet header, said header having a catalyst included therein.

8. The method of claim 7 wherein said fuel is added into said stream of steam through a hollow needle inserted within said stream of steam.

9. The method of claim 8 wherein said fuel is maintained below a predesignated temperature until just prior to being added to said stream of steam.

10. The method of claim 7 wherein said stream of steam is superheated by a superheating device prior to the injection of said fuel into said stream of steam 11. The method of claim 7 further comprising the step of passing said stream of steam and said fuel through a prereformer containing at least one catalyst, prior to passing said stream of steam and fuel into a reformer.

12. A method for reducing carbon deposits in steam reformate systems, said method comprising the step of passing said steam hydrocarbon mixtures through a prereformer that includes catalysts for partially treating said steam hydrocarbon mixtures prior to passing said steam hydrocarbon mixtures through a reformer having a header said header containing a catalyst containing insert therein.

13. A system for reducing carbon deposition in a steam reformer useful for providing hydrogen to a fuel cell, said system comprising;
   steam source, configured to produce a steady source of steam;
   a superheater operatively connected to said steam source, whereby steam from said steam source is transferred to said superheater, said steam super heater configured to superheat steam from said steam source;
   a mixing tube extending between said superheater and a prereformer, said mixing tube having an inlet for receiving delivery of a preselected quantity of a preselected fuel into a stream of steam passing through said mixing tube; said mixing tube being of sufficient proportions so as to allow thorough mixing of said preselected quantity of said preselected fuel within said stream of steam, so as to form a mixture;
   a prereformer operatively connected to said mixing tube, so as to receive said mixture within said prereformer and to treat said mixture with at least catalyst;
   a reformer operatively connected to said prereformer so as to receive a partially treated mixture from said prereformer and to reform said mixture, said reformer having at least one catalyst located within a header of said reformer.

14. In a system comprising a steam source, configured to produce a steady source of steam; a superheater operatively connected to said steam source, whereby steam from said steam source is transferred to said superheater; a mixing tube extending between said superheater and a prereformer, a prereformer operatively connected to said mixing tube, so as to receive a mixture of steam and a fuel within said prereformer and to treat said mixture with at least one catalyst; a reformer operatively connected to said prereformer so as to receive partially treated mixture from said prereformer and to reform said mixture, said reformer having at least one catalyst located within a header portion of an inlet of said reformer; a method for reducing carbon deposition and methane formation in reformate systems, said method comprising the steps of
   providing a stream of steam having a preselected quantity of superheat within said stream of steam by superheating said stream of steam;
   adding a preselected quantity of fuel into said stream of steam, through a hollow needle positioned within said stream of steam, said fuel maintained below a predesignated temperature until just prior to being added to said stream of steam;
   mixing said fuel and stream of steam so as to obtain an even mixing of said fuel within said stream of steam; and
   passing said stream of steam and said fuel through said prereformer containing at least one catalyst, prior to passing said stream of steam and fuel into said reformer.

* * * * *